June 28, 1938. W. H. MASON 2,122,376
PROCESS AND APPARATUS FOR CONTINUOUS DRYING OF FIBERBOARD UNDER PRESSURE
Filed July 3, 1936 2 Sheets-Sheet 2
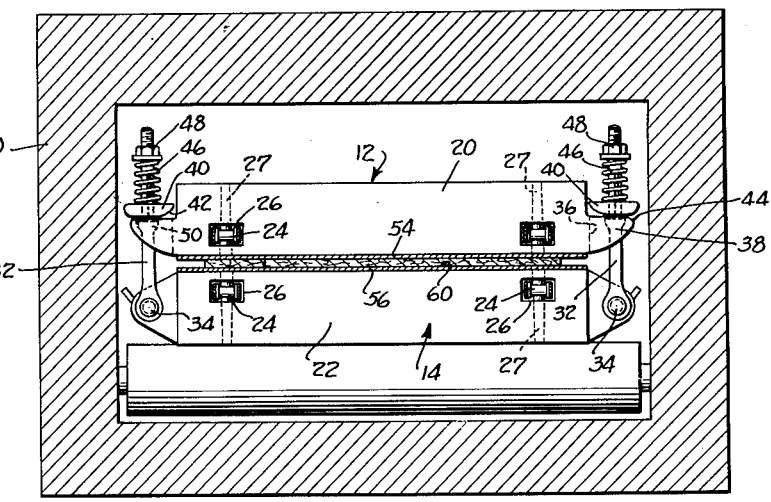
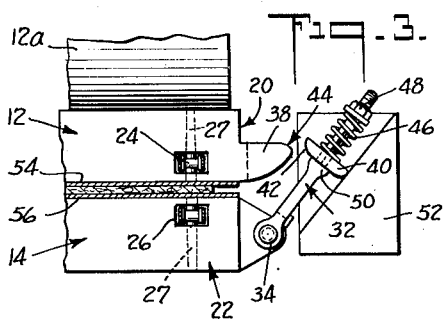
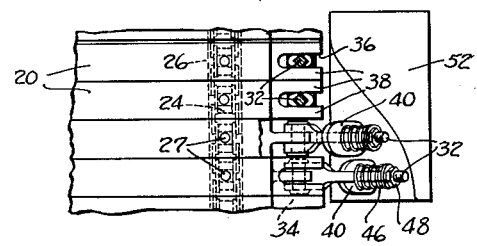
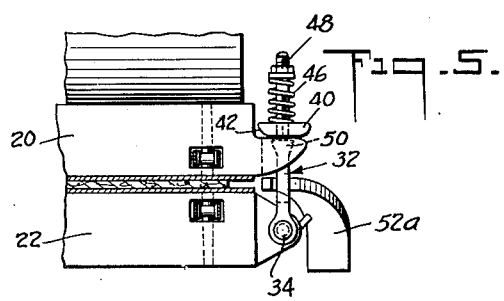
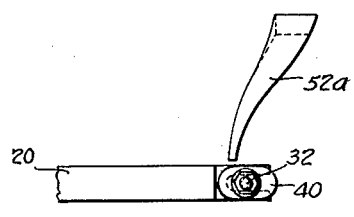
INVENTOR
*William H. Mason*
BY
Dyke & Schaimer
ATTORNEYS Patented June 28, 1938

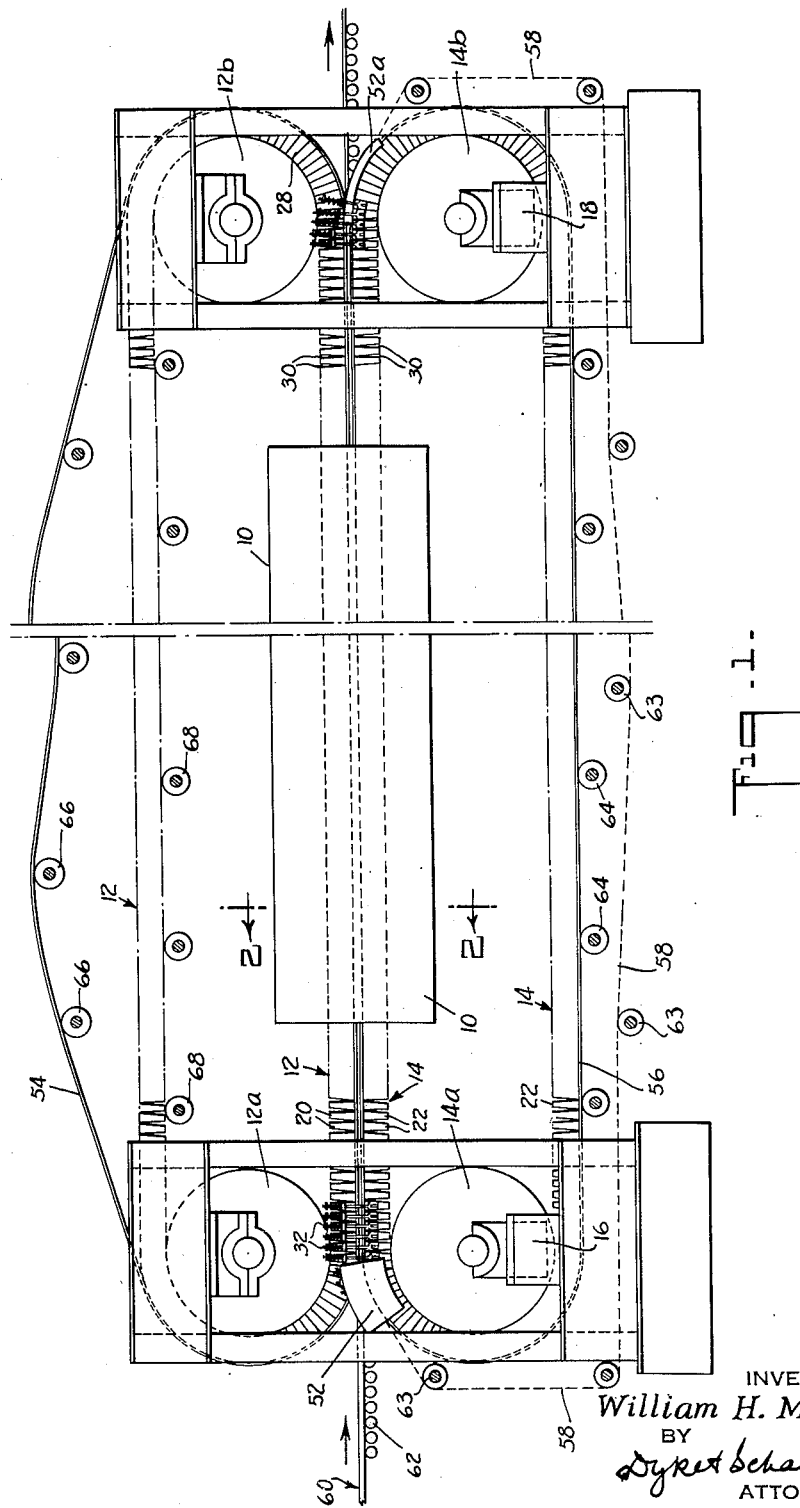

2,122,376

UNITED STATES PATENT OFFICE 2,122,376

PROCESS AND APPARATUS FOR CONTINUOUS DRYING OF FIBERBOARD UNDER PRESSURE

William H. Mason, Laurel, Miss., assignor to Masonite Corporation, Laurel, Miss., a corporation of Delaware Application July 3, 1936, Serial No. 88,721

7 Claims. (Cl. 34—12)

My invention relates to a process and apparatus for continuous drying of fiber board under pressure.

The principal object of my invention is to provide a process whereby a moist fiber sheet which is formed continuously, is traveled continuously through a drier while continuously kept under pressure, whereby a continuous sheet dried under pressure is produced and may be cut into pieces of any desired length.

A further object consists in the provision of such a process in which preliminary application of pressure is made to the sheet higher than that continuously applied throughout the drying operation, whereby water which is brought to the surface by the high pressure, but not driven off, is reabsorbed upon the pressure being reduced, and production of surface defects known as water spots is avoided.

A further object of the invention consists in continuously traveling a sheet of wire mesh with the sheet being dried, whereby provision is made for ready egress of moisture from the traveling sheet as same is being dried under pressure by a continuous drying operation.

A further object consists in the provision of apparatus by which my process steps can be efficiently carried out.

Further objects will appear from the following description of preferred embodiments presented to afford an understanding of illustrative ways in which the invention can be carried out.

In the accompanying drawings:

Fig. 1 is a side elevational view of a preferred form of apparatus;

Fig. 2 is a transverse section on line 2—2, Fig. 1;

Fig. 3 is a detail end view, partly in section, of locking mechanism;

Fig. 4 is a plan view of Fig. 3;

Fig. 5 is a detail end view, partly in section, of unlocking mechanism; and

Fig. 6 is a plan view of Fig. 5.

The apparatus shown comprises a pair of continuously operating girder belts between which the wetlap sheet is held under pressure while being carried through an oven 10.

The girder belts are preferably arranged generally horizontally, the upper belt 12 being carried around rolls 12a and 12b, and the lower belt 14 similarly carried around rolls 14a and 14b, said rolls being driven by suitable driving means (not shown). With such arrangement one run of belt 12 and one run of belt 14 are adjacent to one another, while the return runs of the belts are separate, being above the upper rolls and beneath the lower rolls respectively.

The pair of rolls 12a, 14a at the entering end are forcibly pressed together, as by means of hydraulic ram 16, and the pair of rolls 12b, 14b at the exit end are preferably similarly forced together by hydraulic ram 18.

The girder belts preferably comprise crossgirders 20 for the upper belt 12, and cross-girders 22 for the lower belt 14, and connecting chain links or the like 24 passing through openings 26 in the girders of each girder belt and flexibly connecting same together to make up a continuous flexible girder belt of great transverse strength. Means such as pins 27 connect the respective girders with the chains. In the form shown this is done by pins 27 being passed through openings in the chain links.

Girders 20, 22 are preferably set close together to form a practically continuous outer belt surface, and each girder is preferably of taper cross-section, so that the girders fit closely together in radial lines in passing about the rollers as indicated at 28, Fig. 1. The taper need not be extreme. When the rolls used are, say, 8 feet in diameter, for example, the taper is not considerable, but is, of course, exaggerated in the drawings. On straight belt-runs, rear wedge-shape openings, as shown at 30, Fig. 1, will appear between the taper-section girders 20, 22.

The girders are clamped or forced together to put pressure on the sheet while passing through the oven 10 and the means shown for this purpose consists of bolts 32 pivoted at 34 to the ends of girders 22, and adapted to be received in end-notches 36 in upper girders 20, said notches 36 being formed between end-lugs 38, 38 of girders 20.

Wedge-washers 40 on bolts 32 have their wedging under-surfaces 42 adapted, upon bolts 32 being forcibly swung into notches 36, to ride up on inclines 44 on lugs 38 so as to be received and held upon said lugs and to compress the springs 46 encircling bolts 32 and held down by nuts 48. When bolts 32 are out of use, shoulders 50 of bolts 32 restrain the movement of wedge-washers 40 under the action of the springs 46. By making the bolts 32 square and providing the wedge-washers 40 with square openings to receive same, wedge-washers 40 are kept in proper alinement to engage and ride up on inclines 44. The springs 46 could be dispensed with, if desired, and the wedging or equivalent action utilized alone for applying pressure, but the construction with strong heavy springs is the preferable embodiment, because best adapted to produce continuous pressure application and to follow up the shrinkage which takes place during drying.

As girders 20, 22 pass between rolls 12a, 14a, and are thereby forced together under high pressure, the bolts 32 of the respective girders 22, moving with the traveling girder belt 14, are forcibly swung into coacting notches 36 of the respective girders 20 of girder belt 12, and in the form shown this is accomplished by said bolts 32 encountering the suitably-formed pusher cam 52, see Figs. 3 and 4, the springs 46 being compressed by the wedge-washers 40 riding on the wedging surfaces 44.

Bolts 32 continue to hold or clamp the girders 20, 22, together in pairs as the adjacent-run portions of the girder belts pass through the oven 10.

After passing through oven 10, bolts 32 are released and thrown down by the cam hook 52a. Cam hook 52a is located so as to encounter bolts 32 as the girders 20, 22, pass between rolls 12b, 14b at the exit end of the apparatus. Rolls 12b, 14b and ram 18 apply pressure in this region so as to permit easy release of bolts 32 by cam hook 52a.

Upon such release, the girder belts may be separated for separate returning movement outside the rolls.

The girder belts 12, 14 are encircled respectively by continuous sheet metal belts 54, 56. Belts 54, 56 may be formed of long strips of steel or other suitable metal welded together and dressed smooth at the welds. The lower sheet metal belt 56 is encircled in turn by a continuous wire mesh belt 58 upon which the wetlap fiber sheet 60 is delivered into the apparatus by any suitable means, as for example over conveyor rollers 62, and carried between entrance rolls 12a, 14a.

Wire mesh belt 58 which underlies the sheet 60 as it travels through the apparatus serves to provide exit paths for outlet of water expressed by rolls 12a, 14a and for outlet of steam during the drying of the sheet 60 as the latter is traveled with wire mesh belt 58 through oven 10.

Wire mesh belt 58 is preferably longer than the belts which it encircles to thereby avoid localized wear and prolong its useful life, and the rollers 63 for supporting and guiding belt 58 in its return movement are located to conform to such increased length.

There is no objection to the lower continuous sheet metal supporting belt 56 being hot or warm when the wetlap sheet 60 comes into contact therewith, and the return run portion can be carried on the rollers 64 which support the girder belt 14 in its return movement.

The continuous upper sheet metal belt 54 which engages and produces the surface formation of the finished sheet 60 is preferably fairly cool or at least not highly heated when the wet sheet 60 comes into contact therewith. For this reason the continuous metal sheet belt 54 is relatively elongated and the return lay thereof is carried upon outwardly disposed rollers 66, so that it is separated from the return lay portion of its girder belt 12, which rests on rollers 68 preferably disposed in substantially straight-line relation, as shown.

That surface of continuous sheet metal belt 54, which engages the fiber sheet 60 is so formed as to give the final sheet-surface effect desired. A frosted chrome-plated surface is ordinarily the most desirable, particularly when the sheet being operated upon is formed principally or entirely of ligno-cellulose fiber containing a sufficiently high proportion of the original fiber constituents other than cellulose to be self-bonding. Such surface is exposed at the outer part of the return lay or run of belt 54, so that access may be readily had thereto for keeping this surface clean and in good condition as it runs along.

The belts or parts thereof can be enclosed as may be desired to prevent undesirable loss of heat. The sheet metal belts 54, 56 bridge over the individual girders and distribute the pressure applied by bolts 32 uniformly throughout the surface of sheet 60.

In operation very high initial pressure is applied by means of rolls 12a, 14a and ram 16 to the moisture containing sheet, which of course after being formed from a water bath has been partially dewatered by being passed through squeeze rolls in connection with its formation.

A relative reduction of pressure takes place upon the girders 20, 22, now locked together in pairs, passing beyond the rolls 12a, 14a between which the highest pressure was encountered, such relative pressure reduction permitting moisture, which was at the surface of the sheet during the roll passage, to be reabsorbed, thereby avoiding production of water spots or like defects at the finished surface.

The sheet 60 clamped by the girders between the sheet metal belts 54, 56, with the mesh belt 58 interposed between such sheet and the sheet metal belt 56, is carried through the hot air drier 10 heated by suitable means, such as gas burners (not shown). The temperature of the drier is preferably least at the entrance end 10a, and highest at the exit end 10b. If, for example, raw fiber of pine wood is used for forming the sheet 60, the heat at the exit end is preferably over 210° C., which is a critical minimum figure for securing maximum bonding effect, hardness, strength and water resistance with such self-bonding material, but the temperature should not be so high as to produce objectionable scorching. When the maximum bonding effect, etc. is not required, lower temperatures may be used, as 375°–400° F., for example.

I claim:

1. Process for continuous drying of sheet products which comprises travelling the sheet through a drier while making continuous application of pressure thereto, and wherein higher pressure is applied to the sheet initially than during the remainder of the pressure application.

2. Process of continuous drying of fiber sheets comprising the steps of continuously traveling the continuous sheet in engagement with continuously traveling wire mesh material, and drying the sheet as it travels, while continuously applying sustained pressure to the sheet, and wherein higher pressure is applied to the sheet initially than during the remainder of the pressure application.

3. Apparatus for continuous drying of fiber sheets under pressure comprising girder belts with adjacent runs, sheet metal belts encircling the respective girder belts, a continuous wire mesh belt encircling one of said sheet metal belts, means for clamping the girders of the belts together during movement in adjacent runs, and a drier through which a sheet, which is clamped between the sheet metal belts with the wire mesh between it and one of the sheet metal belts is traveled by the moving belts.

4. Apparatus for continuous drying of fiber sheets under pressure, comprising girder belts with adjacent runs, means at the ends of the girders for clamping the girders of the respective belts together with a sheet located therebetween, means adjacent one end of the adjacent belt runs for applying such clamping means, and means adjacent the other end for releasing such clamping means.

5. Apparatus for continuous drying of fiber sheets under sustained pressure comprising two pairs of press rolls, girder belts traveling about rolls of each pair, sheet metal belts about the girder belts, a wire mesh belt about a sheet metal belt, means for clamping girders of the respective belts together during movement in adjacent belt runs with the fiber sheet between the sheet metal belts and the wire mesh belt interposed between the sheet and one sheet metal belt, and a drier between the press rolls through which the clamped sheet is traveled.

6. A process of continuous drying of fiber sheets, which comprises pressing together girders in successive pairs with a moist fiber sheet therebetween, clamping the girders of each pair together during such pressure application, passing the clamped-together girders with the sheet compressed therebetween through a drier whereby the sheet is dried, and then unclamping the girders to release the sheet, the pressure applied to permit the clamping operation being higher than the pressure applied by the clamped-together girders during passage of the sheet through the drier.

7. Apparatus for continuous drying of fiber sheets under sustained pressure comprising two pairs of rolls, hydraulic means for pressing the rolls of each pair toward one another at predetermined pressure, girder belts traveling about rolls of each pair with the inner runs of the respective belts adjacent to each other, sheet metal belts about the girder belts, a wire mesh belt about one of said sheet metal belts, means for clamping girders of the respective belts together during movement in the adjacent belt runs with the fiber sheet between the sheet metal belts and with the wire mesh belt interposed between the fiber sheet and one of the sheet metal belts, and a drier between the respective pairs of press rolls and through which the clamped sheet is traveled.

WILLIAM H. MASON.